Patented Mar. 25, 1947

2,417,862

UNITED STATES PATENT OFFICE 2,417,862

DEHYDRATION OF ACETONITRILE BY DECANTATION AND DISTILLATION

Clark H. Dale, Lewiston, N. Y., assignor, by mesne assignments, to United States Vanadium Corporation, a corporation of Delaware No Drawing. Application December 1, 1943, Serial No. 512,477

8 Claims. (Cl. 202—62)

This invention relates to the purification of acetonitrile and more particularly to the recovery of substantially anhydrous acetonitrile from its aqueous solutions.

It has been proposed to recover acetonitrile from its aqueous solution by a salting-out process or by azeotropic distillation with an added ingredient. However, these methods require the addition of materials which must themselves be separated in a final purification.

According to the present invention substantially anhydrous acetonitrile is recovered from its aqueous solutions in a simple manner and without the use of extraneous materials.

Acetonitrile and water form a constant boiling point mixture which, at normal atmospheric pressure, has a boiling point of 76° C. and a composition of approximately 84% nitrile and 16% water, by weight. It, therefore, cannot be concentrated to a higher percentage of nitrile by simple distillation at atmospheric pressure.

According to my process, I concentrate an aqueous acetonitrile solution, either by refrigeration or vacuum distillation, until it contains more nitrile than is present in the constant boiling mixture and then distill the concentrated solution. The distillate, in case the distillation is effected at atmospheric pressure will be a constant boiling mixture containing about 84% nitrile and 16% water and the residue in the still will be substantially anhydrous acetonitrile which may either be run off or distilled. The 84% nitrile constant boiling point mixture is recycled.

When concentrating by refrigeration, I cool an aqueous solution containing from about 80% to 84% acetonitrile; usually the constant boiling point solution containing 84% nitrile as this may easily be obtained by distillation at atmospheric pressure from dilute solutions, until it is partially frozen, thus obtaining a solid (ice) phase and a liquid phase. The liquid phase is richer in nitrile than is a constant boiling (84% nitrile) solution and the ice phase is poorer in nitrile than is such solution. The phases are separated and the liquid phase is then distilled. The distillate from the liquid phase, if the distillation is effected at atmospheric pressure, is a constant boiling mixture containing 84% acetonitrile and is returned to the system for further cooling; the liquid remaining in the still is substantially anhydrous acetonitrile and is either run from the still or distilled. The ice phase, previously mentioned, may be concentrated, for instance by distillation, at atmospheric pressure, to yield a constant boiling mixture (84% nitrile) and leave water in the still. The water is discarded and the distillate, which is a constant boiling mixture, is recycled.

When concentrating by vacuum distillation, I may distill an acetonitrile solution of any concentration, for instance a very dilute solution, or the previously mentioned ice phase or the 84% nitrile solution, and obtain, in the first running of the distillate, an aqueous nitrile solution containing more than 84% nitrile. The amount of acetonitrile in this distillate is higher, the higher the vacuum under which the distillation is run. When the distillate contains no more acetonitrile, the residue in the still is water which is discarded. The distillate is then redistilled, preferably at atmospheric or higher pressures; the distillate from this redistillation is a constant boiling mixture containing 84% nitrile if the distillation is at atmospheric pressure, and less if the distillation is at higher pressures, and is recycled. The liquid remaining in the still is substantially anhydrous acetonitrile and is either run from the still or distilled.

The invention may further be illustrated by the following examples:

Example 1

A constant boiling mixture of acetonitrile, containing about 16% by weight of water was partially frozen in a rapid manner by means of a bath comprising acetone and solid carbon dioxide. From 365 parts of the partly frozen mixture, there was separated 125 parts of a concentrated solution containing about 119 to 120 parts (95.5%) by weight of acetonitrile. This concentrated solution was then distilled at atmospheric pressure to effect a further separation. After taking off about 35 parts by weight of constant boiling mixture, there was obtained about 90 parts by weight of anhydrous acetonitrile distilling at 81°–81.5° C.

The remaining 240 parts by weight of original mixture which was obtained in the form of ice crystals containing about 187 parts (78%) by weight of acetonitrile was then concentrated by distillation at atmospheric pressure to obtain the constant boiling mixture. The two constant boiling mixtures thus obtained were combined and the concentration by freezing again carried out as described.

Example 2

A constant boiling aqueous solution containing 84% acetonitrile was separated into a liquid phase and an ice phase by cooling in a brine bath having a temperature of —15° C. From 400 parts by weight of the partially frozen mixture, there was separated 78 parts of ice phase and 322 parts of a concentrated solution containing about 288 parts (89.5%) by weight of acetonitrile. This concentrated solution was then distilled at atmospheric pressure to effect a further separation and yielded 211 parts by weight of constant boiling mixture and 111 parts by weight of anhydrous acetonitrile.

The 78 parts of ice phase containing 48 parts (61.5%) by weight of acetonitrile was concentrated and used as described in Example 1.

Acetonitrile and water are not miscible in all proportions at all temperatures and aqueous solutions containing from about 30% to about 80% by weight of acetonitrile form two layers on cooling to a temperature varying from about −0.9° C. to about −9.5° C. depending on the percentage of nitrile present. I may take advantage of this layer separation for the more efficient utilization of refrigeration and the concentration of aqueous nitrile solutions. Thus, as the ice phase of either of the foregoing examples absorbs heat, the mass melts giving a liquid which separates into two layers, but again becomes a homogeneous liquid at higher temperatures. When the layers separate, the upper layer is richer in nitrile than the lower. Each layer may be withdrawn separately and returned to the cycle at the appropriate point or otherwise processed.

The folowing examples will serve to illustrate this phase of the invention.

Example 3

The temperature of an ice phase obtained as in Example 1 was allowed to rise. At −9.8° C. the crystals had melted and the liquid separated into two layers. The lower layer, which was poorer in acetonitrile than the upper layer, was distilled at atmospheric pressure in order to separate the small amount of acetonitrile present as the constant boiling mixture which was then frozen by the previously described method. The upper layer was further freed of water by the freezing method as in Examples 1 and 2, giving an ice phase and a liquid phase which were treated according to the foregoing examples.

Example 4

The temperature of an ice phase obtained as in Example 2 was allowed to rise. At a temperature of −9.8° C., the crystals had melted and the liquid separated into two layers. These layers were treated as in Example 3.

The layer separation may also be used effectively in the concentration of aqueous nitrile solutions, starting at room temperature.

The following examples will serve to illustrate this prase of the invention.

Example 5

A solution of 75 parts of acetonitrile and 25 parts of water was cooled to −5° C., at which temperature layers formed, the upper layer being richer in the nitrile than the lower. The layers were separated and treated as in Example 3.

Example 6

A solution of 35 parts of acetonitrile and 65 parts of water was cooled to −5° C., at which temperature layers separated, the upper layer being richer in the nitrile than the lower. These layers were separated and treated as in Example 3.

As indicated previously the fractional freezing may be carried to any point desired and may occur as a single freezing step or with a preliminary cooling step (to give layer separation) followed by a freezing of the layer in which the nitrile is most concentrated; but the final freezing prior to that distillation which gives the substantially anhydrous nitrile must produce a phase in which the nitrile is concentrated to a point higher than its concentration in its aqueous constant boiling point mixture.

The following examples illustrate the method of concentrating acetonitrile solutions by vacuum distillation and recovering substantially anhydrous acetonitrile.

Example 7

A charge of 352 parts by weight of aqueous acetonitrile containing 84% nitrile was heated at an absolute pressure of 70 mm. of mercury. The fluid boiled at 21° C. and 219 parts of distillate were collected leaving 133 parts of residue in the still. The residue contained 98.28 parts of nitrile and 34.72 parts of water (about 73.8% nitrile) and was ready for recycling. The distillate, which was a constant boiling point mixture of acetonitrile and water at 70 mm. pressure, contained 197.40 parts of nitrile and 21.60 parts of water (about 90.2% nitrile). This distillate was distilled at atmospheric pressure leaving 84 parts of substantially anhydrous acetonitrile in the still and yielding 135 parts of 84% aqueous nitrile solution for recycling with other 84% aqueous acetonitrile solutions by this or any of the foregoing examples.

The above procedure recovered, as substantially anhydrous nitrile, about 28.5% of the nitrile in the charge. By continuing the 70 mm. vacuum distillation until all of the nitrile distilled as 90.2% nitrile distillate and then following with the distillation at atmospheric pressure, about 42% of the nitrile in the charge may be recovered as substantially anhydrous nitrile.

Example 8

A charge of 404 parts by weight of aqueous acetonitrile containing 84% nitrile was heated at an absolute pressure of 25 mm. of mercury. The fluid boiled at 16.5–17° C. and 273 parts of distillate were collected leaving 131 parts of residue in the still. The residue contained 91.32 parts of nitrile and 39.68 parts of water (about 69.6% nitrile) and was ready for recycling. The distillate, which was a constant boiling point mixture of acetonitrile and water at 25 mm. pressure, contained 248.04 parts of nitrile and 24.96 parts of water (about 91% nitrile). This distillate was distilled at atmospheric pressure leaving 117 parts of substantially anhydrous acetonitrile in the still and yielding 156 parts of 84% aqueous nitrile solution for recycling.

The above procedure recovered, as substantially anhydrous acetonitrile, about 34.5% of the nitrile in the charge. By continuing the 25 mm. vacuum distillation until all of the nitrile distilled as 91% nitrile distillate and then redistilling at atmospheric pressure, about 47% of the nitrile in the charge may be recovered as substantially anhydrous nitrile.

It will be understood from Examples 7 and 8 that the original charge does not have to be the 84% nitrile solution which is the mixture of acetonitrile and water having a constant boiling point at atmospheric pressure. More dilute or more concentrated solutions may be charged. At 70 mm. pressure, the distillate will be the 90.2% nitrile solution (the constant boiling mixture at 70 mm. pressure) until all of the nitrile has distilled. Thus dilute solutions of acetonitrile may be concentrated leaving only water in the still if the distillation is continued for a sufficiently long time. The more nearly the concentration of the nitrile in the charge approaches 90.2% nitrile, the less is the concentrating effect of the vacuum distillation. At 25 mm. pressure, the distillate will be the 91% nitrile solution. It will also be understood that, although the final distillation to obtain the substantially anhydrous nitrile is, for convenience, preferably effected at atmospheric pressure, it may be effected under superatmosphere. The effect of distillation at reduced pressure is to lower the boiling point of the nitrile-water mixture and increase the nitrile content in the distillate. This effect aids in obtaining a concentrated distillate from dilute aqueous solutions and is used in the concentration step but it reduces the amount of anhydrous nitrile remaining in the still when concentrated solutions are distilled, and reduced pressure is not used in the dehydrating step. Conversely, the effect of distillation at superatmospheric pressure is to raise the boiling point of the nitrile-water mixture and lower the nitrile content in the distillate. The superatmospheric pressure raises the amount of anhydrous nitrile remaining in the still when concentrated solutions are distilled and is used in the dehydrating step but reduces the amount of nitrile in the distillate when dilute nitrile solutions are concentrated and is not used in the concentration step. Very dilute solutions of acetonitrile, for instance, those containing less than 30% nitrile, are preferably concentrated by distillation as the first distillate is a constant boiling mixture containing 84% nitrile, if the distillation is at atmospheric pressure, and containing more nitrile if the distillation is under vacuum; and, after the constant boiling mixture has distilled, only water remains in the still and may be discarded. The cost of concentration by refrigeration for solutions containing more than 30% nitrile may be less than the cost of concentration by distillation and in such instances solutions may be concentrated by refrigeration instead of distillation; and vice versa where heat is low in cost.

Summarizing these procedures, I may proceed in the following manner:

1. Where the acetonitrile solution contains less than 30% nitrile, I prefer to distill the solution to obtain, in the first runnings of the distillate, a constant boiling mixture of the nitrile and water. I prefer to continue this distillation until all of the nitrile comes over as the constant boiling point mixture, leaving in the still water which is discarded. If the distillation is at atmospheric pressure I obtain an aqueous distillate containing 84% nitrile and if the distillation is under a vacuum I obtain a distillate containing more than 84% nitrile.

2. Where the original solution contains between 30% and 80% acetonitrile I may distill to obtain the concentrated solutions described above; or, alternatively, I may refrigerate this 30%–80% nitrile solution until there is a separation of liquid layers. The lower liquid layer will contain less nitrile than the upper liquid layer. If the lower layer contains less than 30% nitrile it is preferably concentrated by distillation as previously described while if it contains more than 30% nitrile it may be concentrated as described for solutions containing between 30% and 84% nitrile. The upper liquid layer may further be refrigerated until there is an ice phase and a liquid phase, the liquid phase containing more than 84% nitrile. The ice phase may be treated as described below. The liquid phase is treated as described below for materials containing more than 84% nitrile. Alternatively, the upper liquid layer may be distilled under vacuum to yield a distillate containing more than 84% nitrile which is treated as described below but the concentration by refrigeration is preferred as the upper liquid layer is cold.

3. Where the original acetonitrile solution contains between about 80% and 84% nitrile, the layers do not separate upon refrigeration, but if the cooling is taken to a sufficiently low temperature, an ice phase and a liquid phase are formed. The liquid phase will contain more than 84% nitrile and is treated as later described. Likewise, where the original nitrile solution contains between about 80% and 84% nitrile, it may be distilled under atmospheric pressure or vacuum to obtain a distillate containing 84% nitrile or more, which is then subjected to concentration or dehydration depending upon the nitrile content.

4. The ice phase is preferably permitted to heat until the liquid separates into upper and lower layers which may be treated as previously described. Alternatively, the ice phase may be distilled to yield a distillate containing 84% nitrile or more (depending upon whether the distillation is under atmospheric pressure or under vacuum) and the distillate may then be subjected to concentration or dehydration depending upon whether it contains 84% nitrile or more than this amount of nitrile.

5. Where the anhydrous acetonitrile is to be finally obtained from the concentrated solutions containing more than 84% nitrile, the solution is distilled at atmospheric or higher pressures. This distillation is continued until all of the water and a portion of the nitrile come over in the distillate as a constant boiling mixture leaving substantially anhydrous nitrile in the still or in a separate portion of a condenser or column if a fractionating condenser and column are used. If aqueous acetonitrile solution is being distilled at atmospheric pressure, the distillate will contain 84% nitrile and the remaining portion of the nitrile which was in the solution charged into the still is recovered as substantially anhydrous nitrile. If the distillation is under superatmospheric pressure, the constant boiling point mixture at the superatmospheric pressure will contain less than 84% acetonitrile and a larger proportion of substantially anhydrous nitrile will be recovered.

6. It will be understood that any acetonitrile solution containing less or more than 30% nitrile may be distilled and the first runnings of the distillate will be a constant boiling mixture. If the distillation is at atmospheric pressure and the nitrile is acetonitrile, the distillate will contain 84% nitrile; if the distillation is under a vacuum, the distillate will contain more than 84% nitrile and if the distillation is under pressure it will contain less than 84% nitrile. Substantially anhydrous acetonitrile may be obtained from any constant boiling point distillate by distilling this distillate under a pressure which is higher than that of the prior distillation, leaving the substantially anhydrous nitrile in the still or drawing it from the proper section of a fractional condenser or column.

7. Any distillate, residue or solution which contains acetonitrile may be treated or recycled in accordance with the foregoing description, depending upon its nitrile content.

The process may be carried out as a continuous operation if so desired or the process may be continuous as to some portions and discontinuous as to others. For continuous operation using cooling for concentration, the material to be fractionally frozen may be forced into one end of a freezing pipe, from the exit end of which will come a mush comprising a crystalline or ice phase and a liquid phase. The liquid phase may be separated from the solid phase by natural draining or suction filtering, or by centrifuging or in any other manner. The liquid phase may be passed continuously into a still apparatus equipped with a fractionating column and condenser from the appropriate sections of which a constant boiling acetonitrile solution and substantially anhydrous acetonitrile may continuously be withdrawn. The ice phase may be passed continuously into a receiver having a perforated floor from which liquid drains as the ice melts. The liquid may be continuously distilled to recover a distillate containing nitrile which is recycled; or the liquid may be passed to a tank to permit the layers to separate, the layers then being treated as previously described.

For continuous operation using distillation for concentration, a continuously operating still apparatus equipped with a fractionating column and condenser, running at either atmospheric or reduced pressure, may be used. From the appropriate sections of the apparatus, nitrile solutions containing 84% or more acetonitrile (or the corresponding constant boiling mixtures of other nitriles) and more dilute nitrile solutions or water may be obtained. The concentrated nitrile solutions may be distilled continuously to yield substantially anhydrous nitrile as previously indicated. Water is discarded where separated and all mixtures of nitrile and water are recycled.

An advantage of the process described is its simplicity and the fact that extraneous materials which later have to be eliminated are not introduced. Also, the process is operable at atmospheric pressure if desired and with relatively simple apparatus. However, all or any of the operations may take place under pressures which are higher or lower than atmospheric as previously indicated. In general, there is no material advantage gained by using other than atmospheric pressure at the freezing operation.

A further advantage of the process is that impurities (in addition to water) which may occur in the original crude nitrile solution may be prevented from appearing in the final acetonitrile by either the freezing or distillation.

From the previous description it will be seen that there are numerous variations in the process, for instance variations in the composition of the solutions treated and obtained as a result of the various operations, as well as variations in the temperatures used for freezing and for cooling to give layer separation, the use of vacuum and pressure, and the like. It is, therefore, desired that the invention be construed as including these variations and equivalents and as broadly as the following claims taken in conjunction with the prior art may allow.

What is claimed is:

1. Method of recovering substantially anhydrous acetonitrile from aqueous solutions thereof which comprises cooling to a temperature below 0° C. an aqueous solution of the nitrile until there is formed an aqueous solution of the nitrile which is richer in nitrile than is an aqueous nitrile solution which has a constant boiling point, separating the concentrated solution from the remainder of the original solution and distilling the concentrated solution to remove substantially all of the water and a portion of the nitrile as a constant boiling mixture, leaving substantially anhydrous nitrile.

2. Method of recovering substantially anhydrous acetonitrile from aqueous solutions thereof which comprises cooling to a temperature below 0° C. an aqueous solution of the nitrile until there are formed a solid phase and a liquid phase which is an aqueous solution of the nitrile richer in nitrile than is an aqueous nitrile solution which has a constant boiling point, separating the phases and distilling the concenerated solution to remove substantially all of the water and a portion of the nitrile as a constant boiling mixture, leaving substantially anhydrous nitrile.

3. Method of recovering substantially anhydrous acetonitrile from aqueous solutions thereof which comprises holding at a temperature below 0° C. an aqueous solution of the nitrile until there are formed a plurality of liquid layers one of which layers is richer in nitrile than another, removing said layer which is richer in nitrile, cooling this layer until there is formed an aqueous solution of the nitrile which is richer in nitrile than is an aqueous nitrile solution which has a constant boiling point at atmospheric pressure, and distilling the concentrated solution to remove substantially all of the water and a portion of the nitrile as a constant boiling mixture, leaving substantially anhydrous nitrile.

4. Method of recovering substantially anhydrous acetonitrile from aqueous solutions thereof which comprises cooling to a temperature below 0° C. an aqueous solution of the nitrile until there are formed a plurality of liquid layers one of which layers is richer in nitrile than another, removing said layer which is richer in nitrile, cooling this layer until there is separated an aqueous solution of the nitrile which is richer in nitrile than is an aqueous nitrile solution which has a constant boiling point, and distilling the concentrated solution to remove substantially all of the water and a portion of the nitrile as a constant boiling mixture, leaving substantially anhydrous nitrile.

5. Method of recovering substantially anhydrous actonitrile from aqueous solutions thereof which comprises cooling to a temperature below 0° C. an aqueous solution of the nitrile until there are formed a plurality of liquid layers one of which layers is richer in nitrile than another, removing said layer which is richer in nitrile, cooling this layer until there are formed a solid phase and a liquid phase which is an aqueous solution of the nitrile richer in nitrile than is an aqueous nitrile solution which has a constant boiling point at atmospheric pressure, and distilling the concentrated solution to remove substantially all of the water and a portion of the nitrile as a constant boiling mixture, leaving substantially anhydrous nitrile.

6. Method of recovering substantially anhydrous acetonitrile from aqueous solutions thereof which comprises: step A, concentrating the solution by distilling the solution at atmospheric pressure and collecting a distillate containing substantially 84% nitrile; step B, cooling the distillate of step A to a temperature below 0° C.

until there are formed a solid phase and a liquid phase which is an aqueous solution of the nitrile containing more than 84% nitrile; step C, distilling the liquid phase of step B to separate a distillate containing substantially 84% nitrile and leave substantially anhydrous nitrile; step D, recycling the distillate of step C containing substantially 84% nitrile in accordance with step B; step E, submitting said solid phase of step B to the distillation of step A.

7. Method of recovering substantially anhydrous acetonitrile from aqueous solutions thereof which comprises: step A, concentrating the solution by distilling the solution at atmospheric pressure and collecting a distillate containing substantially 84% nitrile; step B, cooling the distillate of step A until there are formed a solid phase and a liquid phase which is an aqueous solution of the nitrile containing more than 84% nitrile; step C, distilling the liquid phase of step B to separate a distillate containing substantially 84% nitrile and leave substantially anhydrous nitrile; step D, recycling the distillate of step C containing substantially 84% nitrile in accordance with step B; step E, warming said solid phase until there are formed a lower liquid layer and an upper liquid layer which is richer in nitrile than the lower layer; step F, separating the layers; step G, submitting the lower layer to the distillation of step A; step H, cooling the upper layer until there are formed a solid phase and a liquid phase which is an aqueous solution of the nitrile containing more than 84% nitrile; step I, submitting the liquid phase of step H to the distillation of step C; step J, submitting the solid phase of step H to the distillation of step A.

8. Method of recovering substantially anhydrous acetonitrile from aqueous solutions thereof containing between approximately 30% and 80% nitrile which comprises: step A, cooling the solution until there are formed a lower liquid layer and an upper liquid layer which is richer in nitrile than the lower layer; step B, separating the layers; step C, cooling the upper layer of step A until there are formed a solid phase and a liquid phase which is an aqueous solution of the nitrile containing more than 84% nitrile; step D, distilling the liquid phase of step C to separate a distillate containing substantially 84% nitrile and leave substantially anhydrous nitrile; step E, cooling the distillate of step D until there are formed a solid phase and a liquid phase which is an aqueous solution of the nitrile containing more than 84% nitrile; step F, cycling the liquid phase of step E as the liquid phase of step C; step G, concentrating the lower liquid layer of step A until it contains more than 30% nitrile and recycling; warming a solid phase until there are formed a lower liquid layer and an upper liquid layer which is richer in nitrile than the lower layer, and recycling the layers as the first-mentioned layers.

CLARK H. DALE.

REFERENCES CITED

The following references are of record in the file of this patent:

UNITED STATES PATENTS

| Number | Name | Date |
|---|---|---|
| 2,305,106 | Pratt | Dec. 15, 1942 |
| 2,286,056 | Brown | June 9, 1942 |
| 2,160,064 | Eversole | May 30, 1939 |
| 1,676,700 | Lewis | July 10, 1928 |
| 1,911,832 | Lewis | May 30, 1933 |
| 2,229,219 | Oxley | Jan. 21, 1941 |

OTHER REFERENCES

Young, "Distillation Principles and Process," 1922, pages 59 to 61.

Morton, "Laboratory Technique in Organic Chemistry," pgs. 69 to 71.

Industrial and Egineering Chemistry Anayltical edition, vol. 2, pages 109 to 113.